United States Patent
Hamaguchi et al.

(10) Patent No.: US 9,252,872 B2
(45) Date of Patent: Feb. 2, 2016

(54) CROSSTALK MEASURING METHOD AND CROSSTALK MEASURING DEVICE

(71) Applicants: FUJIKURA LTD., Tokyo (JP); NIPPON TELEGRAPH AND TELEPHONE CORPORATION, Tokyo (JP)

(72) Inventors: Hiroki Hamaguchi, Sakura (JP); Shoichiro Matsuo, Sakura (JP); Itaru Ishida, Sakura (JP); Yukihiro Goto, Tokyo (JP); Kazuhide Nakajima, Tokyo (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 400 days.

(21) Appl. No.: 13/923,990

(22) Filed: Jun. 21, 2013

(65) Prior Publication Data
US 2014/0003807 A1   Jan. 2, 2014

(30) Foreign Application Priority Data
Jun. 22, 2012 (JP) ................. 2012-141448

(51) Int. Cl.
*H04B 10/08* (2006.01)
*H04B 10/079* (2013.01)
*G02B 6/02* (2006.01)
*H04B 10/071* (2013.01)

(52) U.S. Cl.
CPC ........ *H04B 10/0795* (2013.01); *G02B 6/02042* (2013.01); *H04B 10/071* (2013.01)

(58) Field of Classification Search
CPC .. H04B 10/071; H04B 10/073; H04B 10/075; H04B 10/079; H04B 10/0791; H04B 10/0793; H04B 10/0795; H04B 10/07955; G02B 6/02042; G02B 6/03638
USPC ........... 398/16, 10, 13, 17, 20, 21, 25, 28, 29, 398/30, 31, 32, 33, 34, 38; 356/73.1; 385/123, 124, 126, 127, 128
See application file for complete search history.

(56) References Cited

U.S. PATENT DOCUMENTS 6,366,347 B1 * 4/2002 Boscher ................ G01M 11/33
  356/73.1
8,655,167 B1 * 2/2014 Lam ..................... H04B 10/071
  398/16

FOREIGN PATENT DOCUMENTS

JP   2011-242204 A   12/2011

OTHER PUBLICATIONS

Ohashi M. et al., "Simple technique for measuring crosstalk of multicore fiber using OTDR", B-13-52, IEICE, p. 556, (2012), w/English translation, cited in Japanese Notice of Allowance dated Jul. 22, 2014.

(Continued)

*Primary Examiner* — Hanh Phan
(74) *Attorney, Agent, or Firm* — Westerman, Hattori, Daniels & Adrian, LLP

(57) ABSTRACT

For example, of a first intensity distribution waveform WF1 indicated by a distance distribution of an intensity of light which returns to one end of a core of a multicore fiber, and a second intensity distribution waveform WF2 indicated by a distance distribution of an intensity of light which returns to the other end of the core, the second intensity distribution waveform WF2 is inverted. Further, for example, an inverted intensity distribution waveform WF3 which is inverted and the first intensity distribution waveform WF1 which is not inverted are added.

20 Claims, 13 Drawing Sheets

(56) References Cited

OTHER PUBLICATIONS

Kowaliuk K. W. et al., "A Technique to Estimate the Cutoff Wavelength Profile in Single Mode Fibers Using a switchable Dual Wavelength OTDR", Tech. Digest Symp. on Optical Fiber Measurements, Bouder, pp. 123-126, (1988).

Takenaga, K., et al., "Reduction of Crosstalk by Trench-Assited Multi-Core Fiber", OFC2011, OWJ4, pp. 1-3.

* cited by examiner

```
WAVEFORM ACQUIRING STEP    — SP1
           ↓
WAVEFORM PROCESSING STEP   — SP2
           ↓
WAVEFORM MATCHING STEP     — SP3
           ↓
     NOTIFYING STEP        — SP4
```

CROSSTALK MEASURING METHOD AND CROSSTALK MEASURING DEVICE

BACKGROUND OF THE INVENTION

The present invention relates to a crosstalk measuring method and a crosstalk measuring device, and is suitable to measure crosstalk in a multicore fiber.

A multicore fiber has a structure which includes a plurality of cores and a clad which fills between the cores and surrounds all of the plurality of cores, and can transmit signals through respective cores.

In this multicore fiber, crosstalk occurs between cores, and it is important to learn characteristics of this crosstalk.

A measuring method of measuring a level of crosstalk is a measuring method disclosed in, for example, the following documents. According to this measuring method, a power ratio of light which enters one given core of the multicore fiber and light which is output from a core adjacent to the core is measured.

K. Takenaga et al., "Reduction of Crosstalk by Trench-Assisted Multi-Core Fiber" OFC2011, OWJ4.

SUMMARY OF THE INVENTION

However, according to the measuring method according to K. Takenaga et al., "Reduction of Crosstalk by Trench-Assisted Multi-Core Fiber" OFC2011, OWJ4, the entire multicore fiber is simplistically regarded as one channel, and therefore there is a problem that it is not possible to capture details such as a position of crosstalk in a core length direction and a level of the crosstalk.

It is therefore an object of the present invention to provide a crosstalk measuring method and a crosstalk measuring device which can capture more detailed crosstalk characteristics.

To solve a task, a crosstalk measuring method according to the present invention includes: an acquiring step of acquiring data which indicates a distance distribution of an intensity of light which enters one end of a core of a multicore fiber and returns to the one end, and data which indicates a distance distribution of an intensity of light which enters other end of the core and returns to the other end; and a waveform processing step of generating a waveform which includes as a main component a component produced by crosstalk as a factor, using an inverted intensity distribution waveform obtained by symmetrically inverting at a center position of a distance one of a first intensity distribution waveform indicated by the data which indicates the distance distribution of the intensity of the light returning to the one end and a second intensity distribution waveform indicated by the data which indicates the distance distribution of the intensity of the light returning to the other end and the other one of the first intensity distribution waveform and the second intensity distribution waveform.

Further, the crosstalk measuring device according to the present invention has a waveform processing unit which performs waveform processing using a first intensity distribution waveform indicated by a distance distribution of an intensity of light which enters one end of a core of a multicore fiber and returns to the one end, and a second intensity distribution waveform indicated by a distance distribution of an intensity of light which enters other end of the core and returns to the other end, and the waveform processing unit generates a waveform which includes as a main component a component produced by crosstalk as a factor, using an inverted intensity distribution waveform obtained by symmetrically inverting at a center position of a distance one of the first intensity distribution waveform and the second intensity distribution waveform and the other one of the first intensity distribution waveform and the second intensity distribution waveform.

This crosstalk measuring method or crosstalk measuring device uses the inverted intensity distribution waveform obtained by inverting one of the first intensity distribution waveform and the second intensity distribution waveform, and the other one of the first intensity distribution waveform and the second intensity distribution waveform, so that it is possible to obtain a characteristic waveform which focuses upon crosstalk.

Consequently, it is possible to recognize a position of crosstalk in a core length direction and a level of the crosstalk.

It is possible to provide the crosstalk measuring method and the crosstalk measuring device which can capture more detailed crosstalk characteristics.

Meanwhile, preferably, the crosstalk measuring method further includes a waveform matching step of detecting a waveform which approximates to a shape of the waveform obtained as a processing result of the waveform processing step, from a plurality of model waveforms in different shapes. Further, preferably, the crosstalk measuring device further has a waveform matching unit which detects a waveform which approximates to a shape of the waveform obtained as a processing result of the waveform processing unit, from a plurality of model waveforms in different shapes.

When this waveform matching step or waveform matching unit is provided, it is possible to recognize a position of crosstalk in a core length direction and a level of the crosstalk based on a waveform shape which differs according to a level of a component produced as a result of crosstalk.

Preferably, the waveform matching step or the waveform matching unit is directed to dividing the waveform obtained as the processing result in the waveform processing step or the waveform processing unit into sections including a plurality of distance widths, and detecting a waveform which approximates to an entire or partial shape of a partial waveform in each of the sections, from the plurality of model waveforms.

By so doing, it is possible to precisely capture a waveform shape and, consequently, improve precision to detect the waveform which approximates to the waveform obtained as the processing result of the waveform processing step or the waveform processing unit, from model waveforms.

Further, preferably, the waveform processing step or the waveform processing unit is directed to adding the inverted intensity distribution waveform and the other one of the first intensity distribution waveform and the second intensity distribution waveform.

When the inverted intensity distribution waveform obtained by inverting one of the first intensity distribution waveform and the second intensity distribution waveform, and the other one of the first intensity distribution waveform and the second intensity distribution waveform are added, a component which is resulted from transmission loss and which is included as one of main components of the intensity is canceled, so that a characteristic added waveform which mainly reflects the component produced by crosstalk as a factor is generated. Further, the shape of the added waveform has a shape matching the level of the component produced by crosstalk as a factor.

Consequently, by detecting the waveform which approximates to the shape of the added waveform from a plurality of model waveforms, it is possible to recognize the position of the component produced by crosstalk as a factor in the core length direction and the level of the component.

Further, the inventors of the present invention found from an experimental result that, compared to a shape of a subtracted waveform from which the inverted intensity distribution waveform obtained by inverting one of the first intensity distribution waveform and the second intensity distribution waveform, and the other one of the first intensity distribution waveform and the second intensity distribution waveform are subtracted, a shape of an added waveform has a greater degree of change matching the amount of the component produced by crosstalk as a factor and is likely to be obtained as a more characteristic shape.

Consequently, when a waveform which approximates to the added waveform is detected from model waveforms, it is possible to improve detection precision compared to a case when a waveform which approximates to the shape of the subtracted waveform is detected.

Further, preferably, the waveform processing step or the waveform processing unit is directed to adding and subtracting the inverted intensity distribution waveform and the other one of the first intensity distribution waveform and the second intensity distribution waveform, and the waveform matching unit detects a waveform which approximates to a shape of a subtracted waveform obtained as a subtraction result of the waveform processing unit, from a plurality of model subtracted waveforms in different shapes and detects a waveform which approximates to a shape of an added waveform obtained as an addition result of the waveform processing unit, from a plurality of model added waveforms in different shapes.

By so doing, compared to a case when the added waveform and the model added waveforms are only matched or the subtracted waveform and the model subtracted waveforms are only matched, it is possible to capture more detailed crosstalk characteristics.

Further, preferably, the waveform processing step or the waveform processing unit is directed to adding and subtracting the inverted intensity distribution waveform and the other one of the first intensity distribution waveform and the second intensity distribution waveform, and the waveform matching unit decides whether or not to divide an added waveform obtained as an addition result of the waveform processing unit into sections including a plurality of time widths, using a subtracted waveform obtained as a subtraction result of the waveform processing unit.

For example, in a waveform obtained by removing from the subtracted waveform the crosstalk component derived from the added waveform, a portion at which specific information changes has a non-linear shape. Further, the subtracted waveform tends to have a shape which reflects a transmission loss component compared to the crosstalk component.

That is, the subtracted waveform based on which whether or not to divide the waveform obtained as the processing result of the waveform processing step or the waveform processing unit is decided is used, so that it is possible to suppress a matching processing load compared to a case when the waveform is divided at all times. Further, it is also possible to match only part of waveform portions according to information obtained from the subtracted waveform.

As a result, it is possible to capture accurate and detailed crosstalk characteristics while suppressing the matching processing load.

Alternatively, preferably, the crosstalk measuring method further includes a crosstalk value calculating step of calculating a crosstalk value at an arbitrary position of the multicore fiber in a longitudinal direction, from the waveform obtained as a processing result of the waveform processing step. Further, preferably, the crosstalk measuring device further has a crosstalk value calculating unit which calculates a crosstalk value at an arbitrary position of the multicore fiber in a longitudinal direction, from the waveform obtained as a processing result of the waveform processing unit.

When this crosstalk value calculating step or crosstalk value calculating unit is provided, it is possible to reduce storage capacity by a degree corresponding to reduction of model waveforms compared to a case when the waveform matching step or the waveform matching unit is provided. Further, it is possible to reduce a calculation load by a degree of skip of matching with model waveforms.

As described above, the present invention provides a crosstalk measuring method and a crosstalk measuring device which can capture more detailed crosstalk characteristics.

DESCRIPTION OF EMBODIMENTS

Preferred embodiments of the present invention will be described in detail below with reference to the accompanying drawings.

Figure 1:
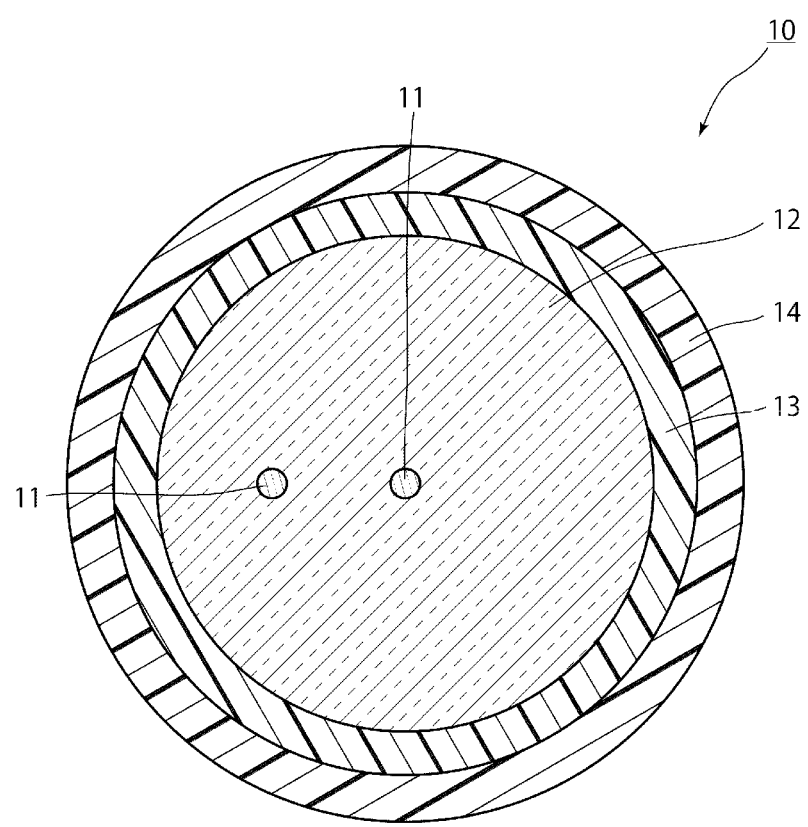
FIG. 1 is a view illustrating a vertical cross section in a fiber length direction when the number of cores of a measurement target multicore fiber of a crosstalk measuring device according to the present embodiment is two.

FIG. 1 is a view illustrating a vertical cross section in a fiber length direction when the number of cores of a measurement target multicore fiber 10 of a crosstalk measuring device according to the present embodiment is two. Further, FIG. 2 is a view illustrating a vertical cross section in the fiber length direction when the number of cores of a measurement target multicore fiber 20 of the crosstalk measuring device according to the present embodiment is seven.

Figure 2:
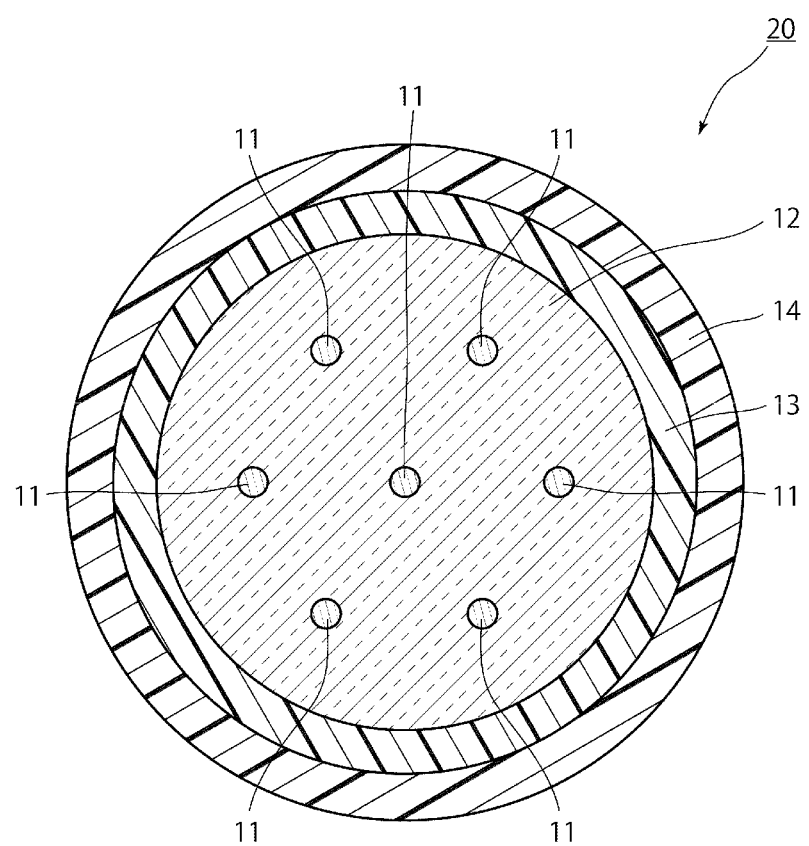
FIG. 2 is a view illustrating a vertical cross section in the fiber length direction when the number of cores of a measurement target multicore fiber of the crosstalk measuring device according to the present embodiment is seven.

As illustrated in FIGS. 1 and 2, the multicore fiber 10 or 20 has a plurality of cores 11, a clad 12 which fills between the cores and surrounds all of the plurality cores 11, an inner protective layer 13 which covers an outer peripheral surface of the clad 12 and an outer protective layer 14 which covers an outer peripheral surface of the inner protective layer 13. The refractive index of each core 11 is higher than that of the clad 12.

In the multicore fiber 10 illustrated in FIG. 1, the number of cores is two, and an arrangement relationship is that one core 11 is in the center and one core 11 is positioned at a certain distance from the center core 11.

Meanwhile, in the multicore fiber 20 illustrated in FIG. 2, the number of cores is 7, and an arrangement relationship is that one core 11 is in the center and the six cores 11 are at equal distances to the center core 11. Further, the inter-center distance of each core 11 is an equal distance, and each core 11 is symmetrical with respect to an axis of the clad 12.

(1) First Embodiment

Figure 3:
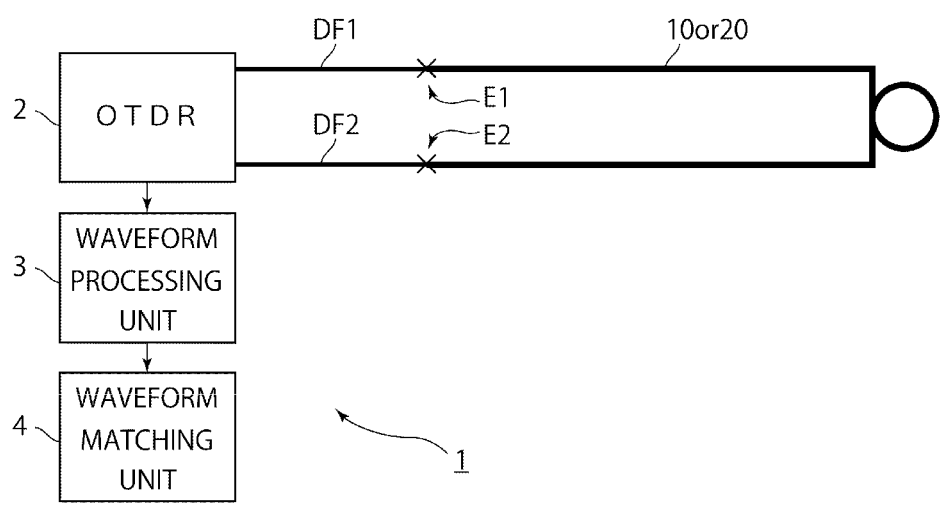
FIG. 3 is a view illustrating a configuration of the crosstalk measuring device according to the first embodiment.

FIG. 3 is a view illustrating a configuration of a crosstalk measuring device 1 according to the first embodiment. As illustrated in FIG. 2, the crosstalk measuring device 1 has an OTDR (Optical Time Domain Reflectometer) 2, a waveform processing unit 3 and a waveform matching unit 4 as main components.

<OTDR 2>

The OTDR 2 is a device which allows pulse light to enter an end of a measurement target optical fiber, and measures a distance distribution of an intensity of light reflected at each point in an optical fiber length direction and returning to an entrance end.

In case of the present embodiment, the OTDR 2 allows pulse light to enter one end E1 of, for example, the core 11 arranged in the center of the multicore fiber 10 or 20 through a measurement target optical fiber (referred to as a "dummy fiber" below) DF1 which allows pulse light to enter. Further, the OTDR 2 measures a distance distribution (referred to as a "first light intensity distribution" below) of the intensity of light returning to the one end E1 of the core 11.

Further, the OTDR 2 allows pulse light to enter an other end E2 on an opposite side of the one end E1 of the core 11 through a dummy fiber DF2, and measures a distance distribution (referred to as a "second light intensity distribution" below) of the intensity of light returning to the other end E2.

<Waveform Processing Unit 3>

The waveform processing unit 3 acquires data of the first light intensity distribution and data of the second light intensity distribution.

Figure 4A:
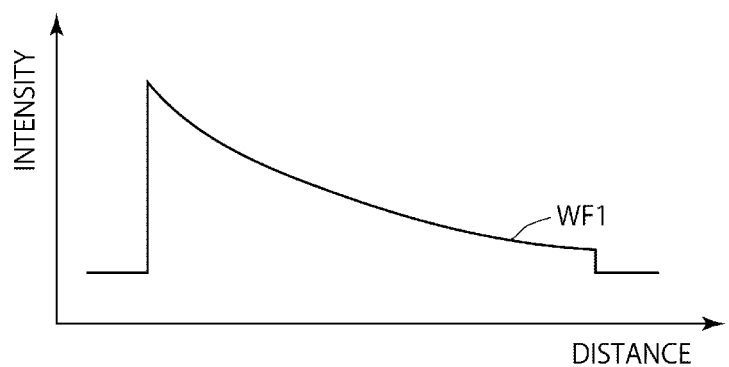
FIGS. 4A to 4D are views illustrating how waveform processing is performed.
Figure 4B:
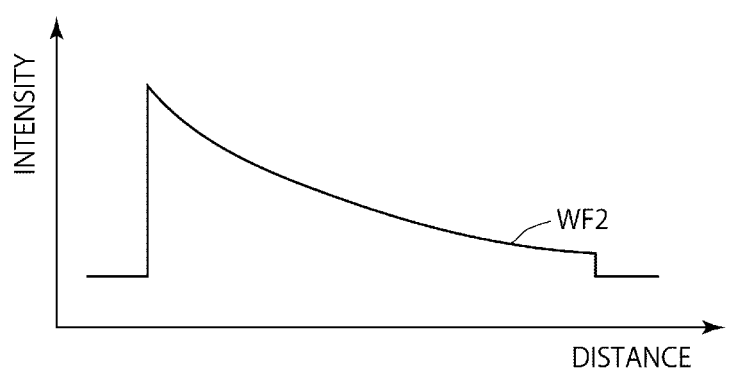

FIGS. 4A to 4D are views illustrating how waveform processing is performed. More specifically, FIG. 4A schematically illustrates a waveform (referred to a "first intensity distribution waveform" below) WF1 indicated by the first light intensity distribution data, and FIG. 4B schematically illustrates a waveform (referred to as a "second intensity distribution waveform" below) WF2 indicated by the second light intensity distribution data.

Figure 4C:
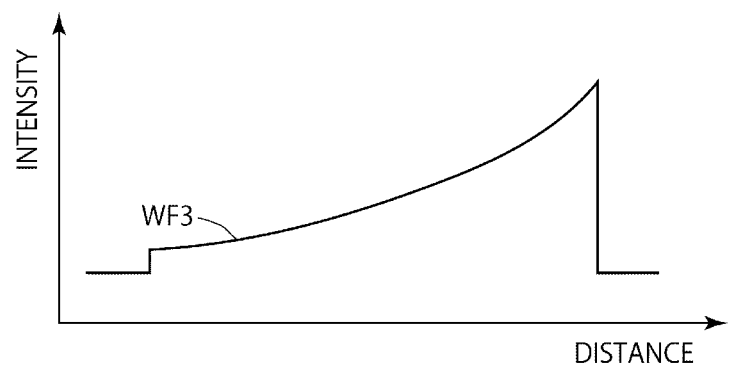
Figure 4D:
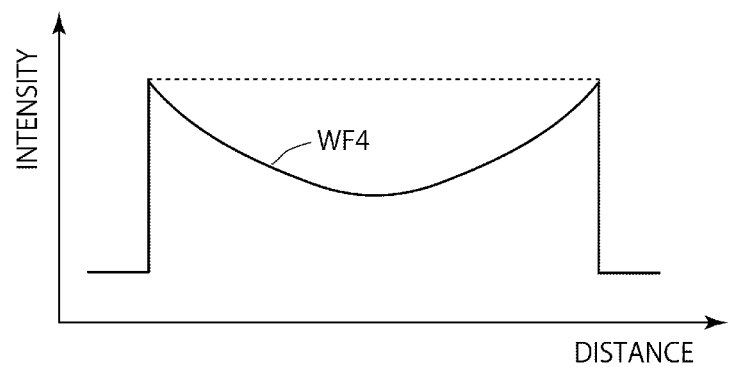

Further, FIG. 4C schematically illustrates a waveform (referred to an "inverted intensity distribution waveform" below) WF3 obtained by horizontally inverting the second intensity distribution waveform WF2, and FIG. 4D schematically illustrates a waveform (referred to as an "added waveform" below) obtained by adding the first intensity distribution waveform WF1 and the inverted intensity distribution waveform WF3.

As illustrated in FIG. 4, the waveform processing unit 3 generates the inverted intensity distribution waveform WF3 by inverting, for example, the second intensity distribution waveform WF2 symmetrically to the center position of the distance. Further, the waveform processing unit 3 adds the inverted intensity distribution waveform WF3 and the first intensity distribution waveform WF1.

The light intensity of each distance of the first intensity distribution waveform WF1 and the second intensity distribution waveform WF2 mainly includes a component produced by transmission loss as a factor (referred to as a "transmission loss component" below) and a component produced by crosstalk as a factor (referred to as a "crosstalk component" below).

As to this transmission loss component, when positions of the cores 11 in the longitudinal direction are the same, values of an inclination of the first intensity distribution waveform WF1 and an inclination of the inverted intensity distribution waveform WF3 are the same although the signs are opposite.

Meanwhile, crosstalk changes according to a distance from an entrance end. Hence, even when the positions of the cores 11 in the longitudinal direction are the same, data upon entrance from the one end E1 of the core 11 and data upon entrance from the other end E2 do not include the same degrees as values of crosstalk components.

Therefore, when the first intensity distribution waveform WF1 and the inverted intensity distribution waveform WF3 obtained by inverting the second intensity distribution waveform WF2 are added, the transmission loss component at each position of the core 11 in the longitudinal direction is canceled, and the crosstalk component is extracted.

More specifically, when there is no crosstalk component, the added waveform WF4 has a roughly linear shape as indicated by a broken line in FIG. 4D, and, when there is a crosstalk component, the added waveform WF4, the added waveform WF4 has a roughly concave shape as indicated by a solid line in FIG. 4D. This concave shape changes according to the level of the crosstalk component. More specifically, when the degree of concavity is greater, the crosstalk component is greater.

<Waveform Matching Unit 4>

The waveform matching unit 4 matches data which indicates the added waveform WF4 obtained as a processing result of the waveform processing unit 3 as one matching target and a data group held in a data storage medium which are model waveforms (referred to as "model added waveforms" below) with respect to the added waveform WF4 as the other matching target in a predetermined order.

Figures 5, 6:
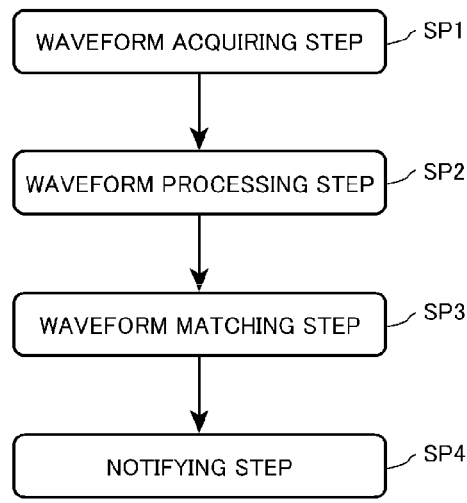
FIG. 5 is a view schematically illustrating content of a data storage medium.
FIG. 6 is a view illustrating a flowchart of a crosstalk measuring method according to the first embodiment.

FIG. 5 is a view schematically illustrating content of a data storage medium. As illustrated in FIG. 5, data which indicates a plurality of items of model added waveforms in different shapes is held in the data storage medium, and the model added waveforms are associated with data which indicates a crosstalk value.

In case of the present embodiment, the waveform matching unit 4 detects a model added waveform which is the most approximate to the added waveform WF4 obtained as the processing result of the waveform processing unit 3, from the model added waveform group held in the data storage medium using, for example, a least-square method. Further, the waveform matching unit 4 recognizes the crosstalk value associated with the detected model added waveform, and notifies this recognition result by way of a video image or an audio.

Next, a relationship between model added waveforms held in the data storage medium and a crosstalk value will be described.

Backscattered light P(z) at a given position z from an entrance point of an optical fiber in the length direction is represented by following equation.

$$P(z) = P_0 \alpha_s(z) B(z) \exp(-2\int_0^z \gamma(x) dx) \quad (1)$$

$P_0$ in this equation (1) represents power at the entrance point (Z=0), $\alpha_s$ represents a backscatter coefficient at the position z, B(z) represents a backscattered light capture coefficient at the position z, and $\gamma(x)$ represents a loss coefficient at a position x.

In addition, equation (1) is reported in, for example, K. W. Kowaliuk and J. Ferner, "A Technique to Estimate the Cutoff Wavelength Profile in Single Mode fibers Using a switchable Dual Wavelength OTDR," Tech. Digest Symp. on Optical Fiber Measurements, Bouder, pp. 123 to 126, 1988.

Meanwhile, an attenuation rate $T_f$ of power due to crosstalk from the entrance point to the position z is represented by the following equation based on a power coupling theory.

$$T_f(z) = \frac{1 + n\exp(-(n+1)hz)}{n+1} \quad (2)$$

n in this equation (2) represents the number of cores arranged at equal intervals in the surrounding of the center core of the multicore fiber, and h represents a power coupling coefficient which indicates the degree of leakage of light. Hereinafter, the power coupling coefficient h is assumed to be fixed in the optical fiber length direction. In addition, equation (2) represents that pulse light enters the center core.

When backscattered light at the position z is produced likewise in an adjacent core, an attenuation rate $T_{ft}$ upon a round trip to the position z is assumed to be an attenuation corresponding to a 2z distance, and can be represented by the following equation.

$$T_{rt}(z) = T_f(2z) \quad (3)$$
$$= \frac{1 + n\exp(-2(n+1)hz)}{n+1}$$

Consequently, by putting equation (3) in the backscattered light P(z) in equation (1), the backscattered light P(z) which reflects an influence of crosstalk can be obtained and, more specifically, is represented by the following equation.

$$P(z) = P_0 \alpha_S(z) B(z) \exp\left(-2\int_0^z \gamma(x) dx\right) \frac{1 + n\exp(-2(n+1)hz)}{n+1} \quad (4)$$

A relationship of the following equation holds between an intensity I(z)[dB] output from the OTDR and the backscattered light P(z) in equation (4).

$$I(z) = \frac{1}{2} 10\log(P(z)) \quad (5)$$

Consequently, when power of pulse light which needs to enter one end of an optical fiber as an entrance point is $P_{0S}$, the intensity $I_S(z)$ output from the OTDR as a measurement result of light (the backscattered light $P_S(z)$) which returns to this end is derived as the following equation.

$$I_S(z) = \frac{1}{2} 10\log(P_S(z)) \quad (6)$$
$$= 5\log(P_{0S}) + 5\log(\alpha_S(z) B(z)) -$$
$$10\log e \int_0^z \gamma(x) dx + 5\log\frac{1 + n\exp(-2(n+1)hz)}{n+1}$$

Next, a case will be described where the other end on the opposite side of one end of the optical fiber is an entrance point. When power of pulse light which needs to enter the other end of the optical fiber as the entrance point is $P_{0E}$, the backscattered light $P_E(z)$ which returns to this other end is represented by the following equation in a state where the position z is inverted in the optical fiber length direction such that the position z matches with the position in case that one end of the optical fiber is the entrance point, and $$P_E(z) = P_{0E} \alpha_S(z) B(z) \exp\left(2\int_0^z \gamma(x) dx\right) \frac{1 + n\exp(-2(n+1)h(L-z))}{1 + n\exp(-2(n+1)hL)} \quad (7)$$

the intensity $I_E(z)$ output from OTDR as the measurement result of the backscattered light $P_E(z)$ is represented by the following equation.

$$I_E(z) = \frac{1}{2} 10\log(P_E(z)) \quad (8)$$
$$= 5\log(P_{0E}) + 5\log(\alpha_S(z) B(z)) + 10\log e \int_0^z \gamma(x) dx +$$
$$5\log\frac{1 + n\exp(-2(n+1)h(L-z))}{1 + n\exp(-2(n+1)hL)}$$

The sum of equation (6) and equation (8) corresponds to the added waveform, and can be simplified as in the following equation.

$$I_S(z) + I_E(z) = 5\log(P_{0S} P_{0E}) + 10\log(\alpha_S(z) B(z)) + \quad (9)$$
$$5\log\left(\frac{(1 + n\exp(-2(n+1)hz))(1 + n\exp(-2(n+1)h(L-z)))}{(n+1)(1 + n\exp(-2(n+1)hL))}\right)$$

The second term in this equation (9) is a term which represents structural irregularity produced by instability of an optical fiber structure as a factor, and the third term is a term which represents the above crosstalk component. When this third term is greater than the second term, it is possible to derive model added waveforms of various shapes by varying the power coupling coefficient h in the third term.

In addition, optical fibers are generally made such that structural stability in the longitudinal direction is in an allowable range, and, in view of this situation, it is assumed to be difficult that the third term becomes smaller than the second term in the multicore fiber as in FIG. 1 or 2.

A crosstalk value XT(z) at the position z of the optical fiber is represented by the following equation based on the power coupling theory.

$$XT(z) = \frac{(1 - T_f(z))/n}{T_f(z)} \quad (10)$$
$$= \frac{1 - \exp(-(n+1)hz)}{1 + n\exp(-(n+1)hz)}$$

By substituting the power coupling coefficient h in this equation (10), the above crosstalk value at the given position z of the optical fiber is calculated.

Thus, it is possible to obtain model added waveforms and a crosstalk value based on above equation (9) and equation (10).

Next, a crosstalk measuring method of the crosstalk measuring device 1 will be described.

FIG. 6 is a view illustrating a flowchart of the crosstalk measuring method according to the first embodiment. As illustrated in FIG. 6, the crosstalk measuring method mainly includes a waveform acquiring step SP1, a waveform processing step SP2, a waveform matching step SP3 and a notifying step SP4.

<Waveform acquiring step SP1>

In this waveform acquiring step SP1, the waveform processing unit 3 acquires the first light intensity distribution data measured by the OTDR 2 and the second light intensity distribution data measured by the OTDR 2.

More specifically, the first light intensity distribution data and the second light intensity distribution data are acquired through an information transmission medium such as a cable wire, an electric communication line and a portable data storage medium.

<Waveform Processing Step SP2>

In this waveform processing step SP2, the waveform processing unit 3 generates the added waveform WF4 using the data acquired in the waveform acquiring step SP1.

More specifically, the second intensity distribution waveform WF2 (FIG. 4B) indicated by the second light intensity distribution data is inverted symmetrically at the center position of the distance, and the inverted intensity distribution waveform WF3 (FIG. 4C) is generated. Next, the inverted intensity distribution waveform WF3 and the first intensity distribution waveform WF1 (FIG. 4A) indicated by the first light intensity distribution data are added, and the added waveform WF4 (FIG. 4D) is generated.

As described above, by adding the first intensity distribution waveform WF1 and the second intensity distribution waveform WF2, the transmission loss component of the transmission loss component and the crosstalk component which are main components of the light intensity of the intensity distribution waveform in each distance is canceled. Hence, the added waveform WF4 mainly has a shape which reflects the crosstalk component, and the shape of the added waveform WF4 has a shape matching the amount of the crosstalk component.

<Waveform Matching Step SP3>

In this waveform matching step SP3, the waveform matching unit 4 detects a model added waveform which is the most approximate to the added waveform WF4 extracted in the waveform processing step SP2, from the data storage medium.

More specifically, model added waveforms which need to be matched with the added waveform WF4 is first selected from the model added waveform group held in the data storage medium, and is read from the data storage medium. Next, the degree of matching between a model added waveform read from the data storage medium and the added waveform WF4 is calculated by, for example, the least-square method. Thus, the degree of matching with the added waveform WF4 is calculated per model added waveform group, and a model added waveform which has the highest degree of matching with the added waveform WF4 among the model added waveform group is detected.

<Notifying step SP4>

In this notifying step SP4, the waveform matching unit 4 notifies a crosstalk value associated with the model added waveform detected in the waveform matching step SP3 by means of, for example, a video image or an audio.

Next, a Modified Example of the first embodiment will be described.

In the first embodiment, the inverted intensity distribution waveform WF3 (FIG. 4C) obtained by inverting the second intensity distribution waveform WF2 (FIG. 4B) and the first intensity distribution waveform WF1 (FIG. 4A) are added. However, the inverted intensity distribution waveform obtained by inverting the first intensity distribution waveform WF1, and the second intensity distribution waveform WF2 may be added.

Further, in the first embodiment, the first intensity distribution waveform WF1 and the inverted intensity distribution waveform WF3 are added to generate the added waveform WF4 (FIG. 4D). However, one of the first intensity distribution waveform WF1 and the inverted intensity distribution waveform WF3 may be subtracted from the other to generate a waveform which is subtracted (referred to as a "subtracted waveform" below), or an added waveform or a subtracted waveform may be both generated.

In addition, when one of the first intensity distribution waveform WF1 and the inverted intensity distribution waveform WF3 is subtracted from the other, above equation (9) is replaced with the following equation.

$$I_s(z) - I_E(z) = 5\log\left(\frac{P_{0s}}{P_{0E}}\right) - 20\log e \int_o^z \gamma(x)\,dx + \qquad (11)$$
$$5\log\left(\frac{(1+n\exp(-2(n+1)hz))(1+n\exp(-2(n+1)hL))}{(n+1)(1+n\exp(-2(n+1)h(L-z)))}\right)$$

The second term in this equation (11) is a term which represents the transmission loss component, and the third term is a term which represents the above crosstalk component. It is possible to derive subtracted waveforms in various shapes by varying the power coupling coefficient h in the third term.

When one of the first intensity distribution waveform WF1 and the inverted intensity distribution waveform WF3 is subtracted from the other as described above, it is possible to hold a model waveforms of a subtracted waveform (referred to as "model subtracted waveforms" below) and crosstalk values in the data storage unit based on above equation (11) and above equation (10).

Figure 7:
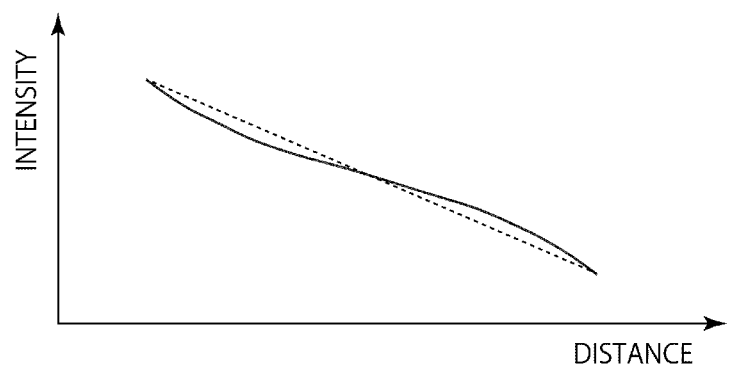
FIG. 7 is a view schematically illustrating a subtracted waveform.

FIG. 7 is a view schematically illustrating a subtracted waveform. When there is no crosstalk component, the subtracted waveform has a roughly linear shape as indicated by a broken line in FIG. 7, and, when there is a crosstalk component, the subtracted waveform has a roughly S shape as indicated by a solid line in FIG. 7. When the degree of a curve of this subtracted waveform is greater, the crosstalk component is greater.

In addition, as is clear from comparison between FIG. 4D and FIG. 7, the shape of the added waveform has a greater degree of change corresponding to the level of the crosstalk component than the shape of the subtracted waveform, and tends to be obtained as a characteristic shape. That is, from the viewpoint of effectively extracting the crosstalk component, the first intensity distribution waveform WF1 and the inverted intensity distribution waveform WF3 are more preferably added than being subtracted. Consequently, when a waveform which approximates to the added waveform is detected, it is possible to improve detection precision compared to a case when a waveform which approximates to the shape of the subtracted waveform is detected.

Further, in the first embodiment, an added waveform is generated based on above equation (9), and a subtracted waveform is generated based on above equation (11). However, when it is possible to generate a waveform which indicates a distance distribution of the light intensity including a distinct crosstalk component, an added waveform or a subtracted waveform may be generated based on calculation other than above equation (9) or above equation (11). To sum up, a waveform which includes as a main component a component produced by crosstalk as a factor may be generated using the inverted intensity distribution waveform obtained by inverting one of the first intensity distribution waveform WF1 and the second intensity distribution waveform WF2, and the other one of the first intensity distribution waveform WF1 and the second intensity distribution waveform WF2.

In the first embodiment, entirety of the added waveform WF4 is matched with model added waveforms. However, a waveform obtained as a processing result of the waveform processing unit 3 may be divided into sections having a plurality of distance widths, and be matched with model waveforms per partial waveform in each section. Further, a partial waveform in part of a section in each section may be matched with model waveforms.

By so doing, it is possible to precisely capture a waveform shape obtained as the processing result of the waveform processing unit 3 and, consequently, improve precision to detect the waveform which approximates to the waveform, from model waveforms. As a result, it is possible to more accurately capture the level of the crosstalk component in the core 11 in the length direction.

In addition, when the waveform processing unit 3 generates both of the added waveform WF4 and the subtracted waveform, the waveform matching unit 4 can decide whether or not to divide the waveform obtained as the processing result of the waveform processing unit 3 into sections having a plurality of distance widths using the subtracted waveform.

For example, in a waveform obtained by removing from the subtracted waveform the crosstalk component derived from the added waveform, a portion at which specific information (power coupling coefficient h) changes has a non-linear shape. Further, the subtracted waveform tends to have a shape which reflects more a transmission loss component compared to the crosstalk component. That is, the subtracted waveform based on which whether or not to divide the waveform obtained as the processing result of the waveform processing unit 3 is decided is used, so that it is possible to suppress a matching processing load compared to a case when the waveform is divided at all times. Further, it is also possible to match only part of waveform portions according to information obtained from the subtracted waveform. As a result, it is possible to capture accurate and detailed crosstalk characteristics while suppressing the matching processing load.

In the first embodiment, the added waveform WF4 and model added waveforms are matched. However, the added waveform WF4 and the model added waveforms, and a subtracted waveform and model subtracted waveforms may be matched. By so doing, compared to a case when the added waveform WF4 and the model added waveforms are only matched or the subtracted waveform and the model subtracted waveforms are only matched, it is possible to capture more detailed crosstalk characteristics.

In the first embodiment, the model added waveforms obtained based on above equation (10) are held in the data storage medium in advance, and model added waveforms read from the data storage medium and an added waveform obtained from a measurement result of the OTDR 2 are matched. However, model added waveforms may be generated based on above equation (10) every time an added waveform obtained from the measurement result of the OTDR 2 is acquired by holding above equation (10), and the model added waveform and the added waveform obtained from the measurement result of the OTDR 2 may be matched. In addition, the same applies to matching of a subtracted waveform and model subtracted waveforms. In summary, a waveform which approximates to a shape of a waveform obtained as a processing result of the waveform processing unit 3 only needs to be detected from a plurality of model waveforms in different shapes.

In the first embodiment, crosstalk values are associated with the model added waveforms held in the data storage medium. However, the power coupling coefficient h in above equation (9) may be associated with the model added waveform instead of the crosstalk values. In addition, when this power coupling coefficient h is associated with the model added waveforms, the waveform matching unit 4 may notify the power coupling coefficient h, and notify the crosstalk value calculated based on the power coupling coefficient h and above equation (10). In addition, the same applies to association with model subtracted waveforms.

EXAMPLES

Although content of the first embodiment will be more specifically described below using Example, the present invention is not limited to the following Example.

Example 1

A two-core fiber as a sample of a multicore fiber 10 in which one core is arranged in the center, and one core is arranged at a position spaced 25 [μm] apart from this core is made to adopt a structure indicated in following Table 1.

TABLE 1

| | Center core | Outer core |
| --- | --- | --- |
| Core delta [%] | 0.8 | 0.8 |
| Core radius [μm] | 3 | 3 |
| Inter-core distance [μm] | 25 | |
| Clad diameter [μm] | 160 | |
| Fiber strip length [km] | 10 | |

Further, two two-[km] single mode fibers are prepared as dummy fibers DF1 and DF2, and one end of one single mode fiber is fused to one end of the center core of the two-core fiber and one end of the other single mode fiber is fused to the other end of the center core of the two-core fiber.

Figure 8A:
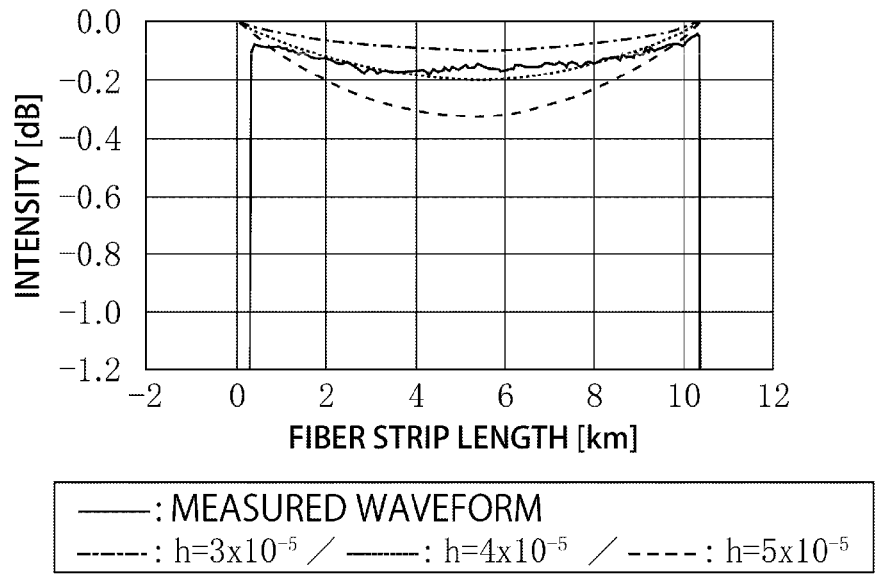
FIGS. 8A and 8B are graphs illustrating an added waveform and a model added waveform according to Example 1.
Figure 8B:
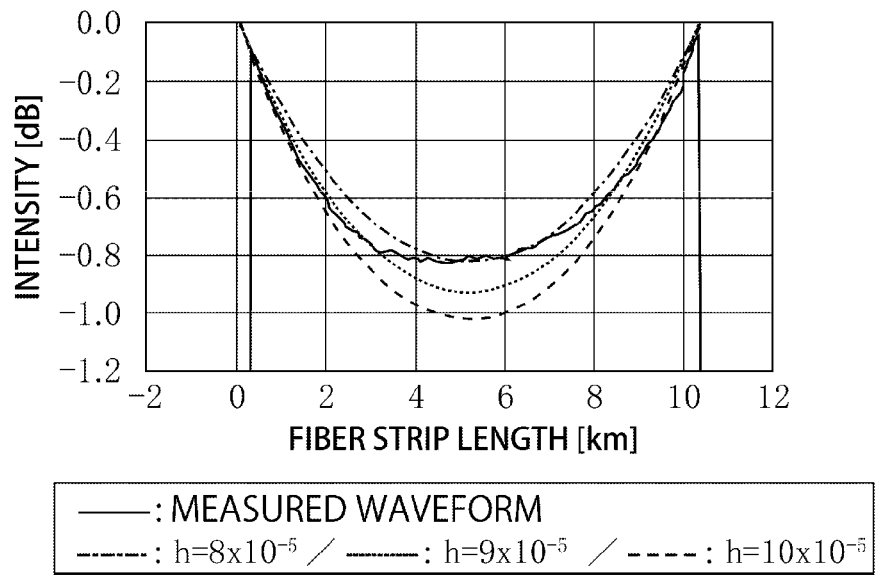

FIGS. 8A and 8B illustrate added waveforms obtained when pulse light enters the center core of this two-core fiber through a single mode fiber and a first light intensity distribution and a second light intensity distribution are measured by an OTDR 2.

More specifically, FIG. 8A illustrates by a solid line an added waveform in case that a wavelength of pulse light is 1550 [nm], and FIG. 8B illustrates by a solid line an added waveform in case that a wavelength of pulse light is 1625 [nm]. Further, waveforms indicated by line types other than the solid lines in FIGS. 8A and 8B are model added waveforms obtained by varying h in equation (9) in which 1 is substituted in n in above equation (9).

As is clear from FIG. 8A, it was found that the added waveform obtained from the measurement result of the OTDR 2 approximates to a model added waveform when the power coupling coefficient h is $4\times10^{-5}$ [m$^{-1}$]. Further, as a result of substituting the power coupling coefficient h in above equation (10) upon z=L=10 km, a value of −5.0 [dB] is obtained as a crosstalk value.

Meanwhile, as is clear from FIG. 8B, it was found that the added waveform obtained from the measurement result of the OTDR 2 approximates to a model added waveform when the power coupling coefficient h is $9\times10^{-5}$ [m$^{-1}$] in the vicinity of 2 [km] and 8 [km] from one end of the two-core fiber, and approximates to a model added waveform when the power coupling coefficient h is $8\times10^{-5}$ [m$^{-1}$] in the vicinity of 5 [km]. Further, as a result of substituting the power coupling coefficient h in above equation (10) upon z=L=10 km, a value of −1.5 [dB] is obtained as a crosstalk value.

Figure 9A:
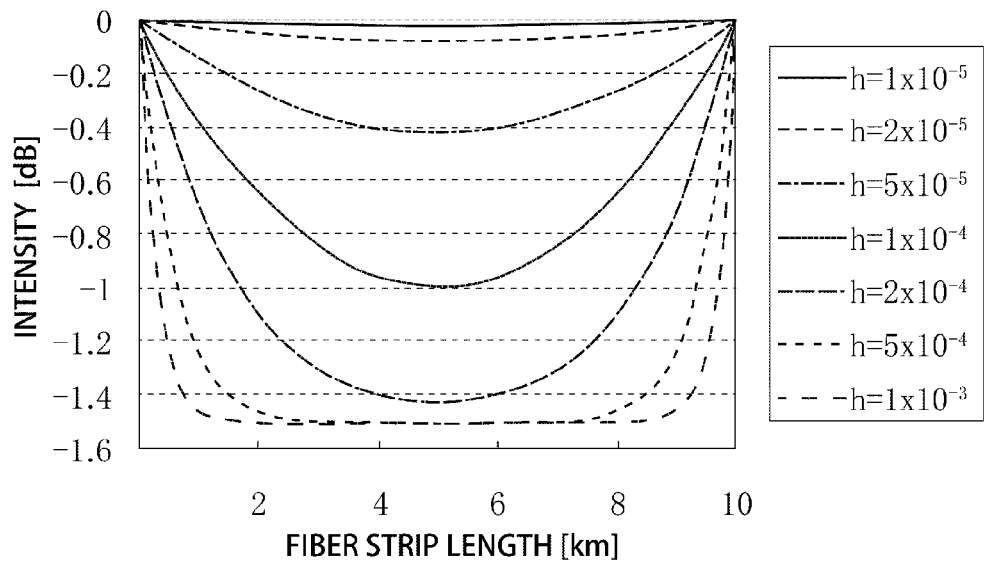
FIGS. 9A and 9B are graphs illustrating a model added waveform and a model subtracted waveform according to Example 1.
Figure 9B:
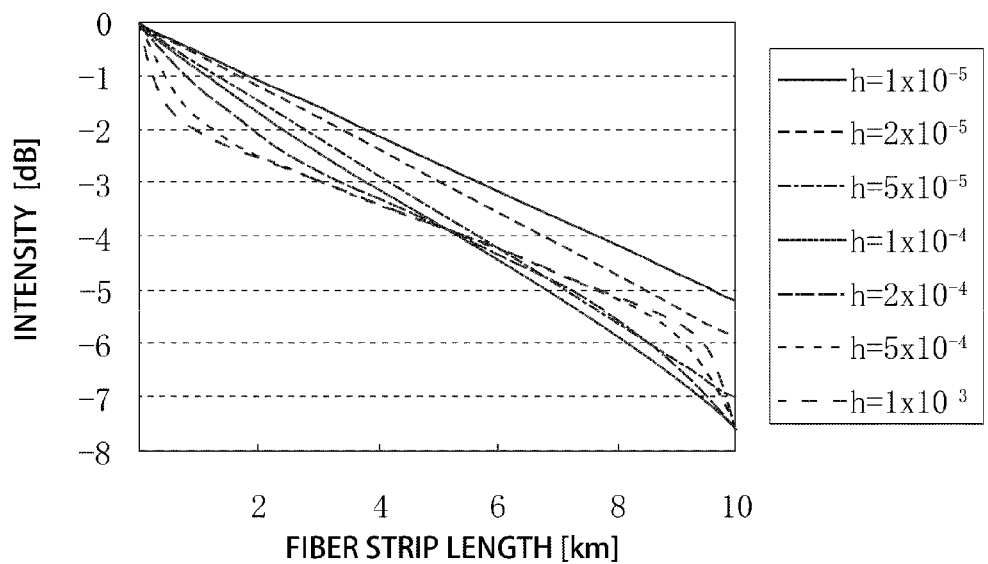

Next, FIGS. 9A and 9B illustrate a model added waveform obtained by varying h in equation (9) obtained in which 1 is substituted in n in above equation (9), and a model subtracted waveform obtained by varying h in equation (11) in which 1 is substituted in n in above equation (11). More specifically, FIG. 9A illustrates the model added waveform, and FIG. 9B illustrates a model subtracted waveform.

As is clear upon comparison between FIGS. 9A and 9B, a model subtracted waveform does not become a characteristic waveform when the power coupling coefficient h is comparatively high compared to the model added waveform. Consequently, it was found that, when an added waveform obtained from a measurement result of the OTDR 2 and model added waveforms are matched, it is possible to obtain a model waveform which is more approximate to the waveform obtained from the measurement result of the OTDR 2 compared to a case when a subtracted waveform obtained from a measurement result of the OTDR 2 and model subtracted waveforms are matched. That is, from a viewpoint of more accurately obtaining a crosstalk value, it is more preferably to match the added waveform obtained from the measurement result of the OTDR 2 and the model added waveform than to match the subtracted waveform obtained from the measurement result of the OTDR 2 and the model subtracted waveforms.

Example 2

A seven-core fiber as a sample of a multicore fiber 20 in which one core is arranged in the center, and six cores are arranged at positions spaced 35 [μm] apart from this core is made to adopt a structure indicated in following Table 2.

TABLE 2

|  | Center core | Outer core |
| --- | --- | --- |
| Core delta [%] | 0.35 | 0.35 |
| Core radius [μm] | 4.5 | 4.5 |
| Inter-core distance [μm] | 35 | |
| Clad diameter [μm] | 195 | |
| Fiber strip length [km] | 50 | |

Further, two two-[km] single mode fibers are prepared as dummy fibers DF1 and DF2 similar to Example 1, and one end of one single mode fiber is fused to one end of the center core of the seven-core fiber and one end of the other single mode fiber is fused to the other end of the center core of the seven-core fiber.

Figure 10A:
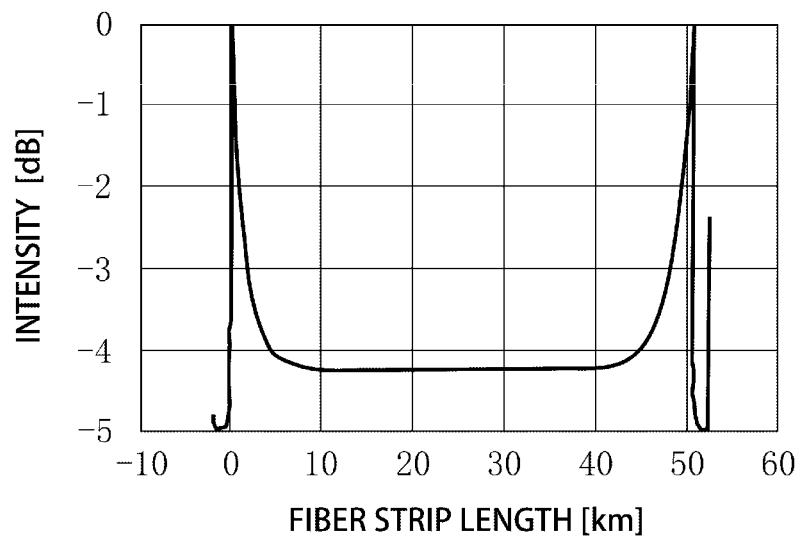
FIGS. 10A and 10B are graphs illustrating added waveforms according to Example 2.
Figure 10B:
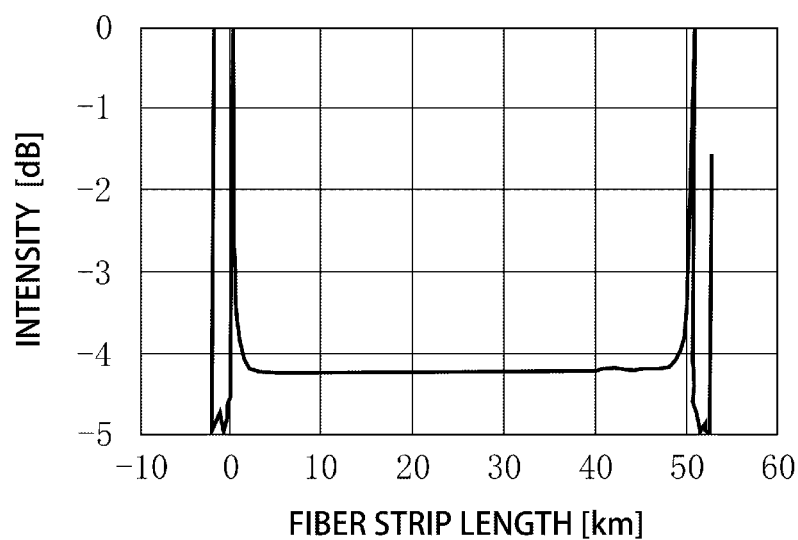

FIGS. 10A and 10B illustrate added waveforms obtained when pulse light enters the center core of this seven-core fiber through a single mode fiber and a first light intensity distribution and a second light intensity distribution are measured by an OTDR 2.

More specifically, FIG. 10A illustrates by a solid line an added waveform in case that a wavelength of pulse light is 1550 [nm], and FIG. 10B illustrates by a solid line an added waveform in case that a wavelength of pulse light is 1625 [nm].

Figure 11A:
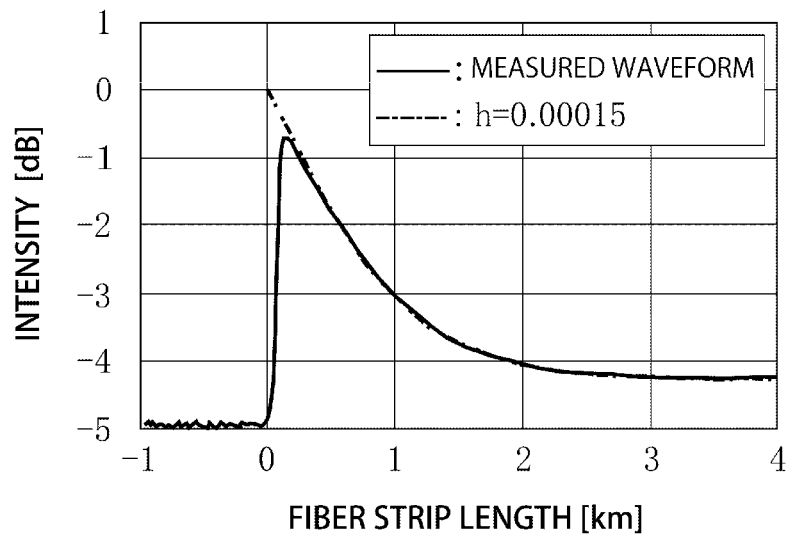
FIGS. 11A and 11B are graphs illustrating an added waveform and a model added waveform according to Example 2.
Figure 11B:
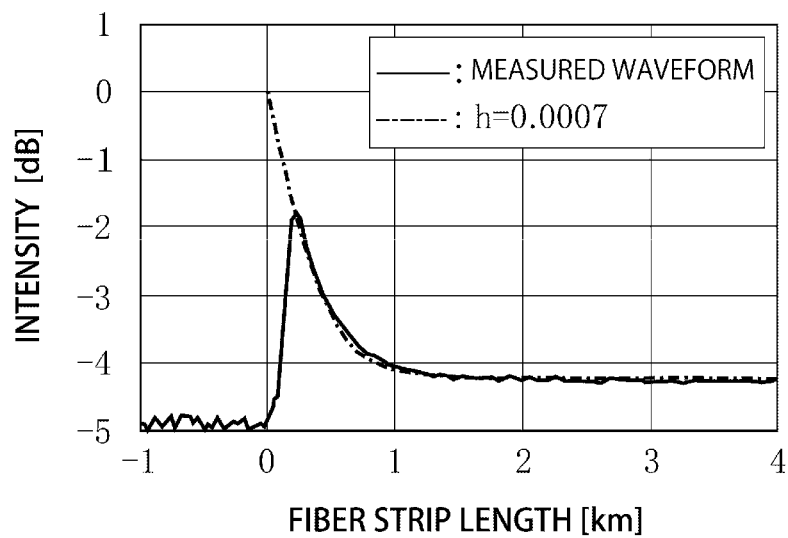

Further, FIGS. 11A and 11B illustrate part of the added waveforms illustrated in FIGS. 10A and 10B, the model added waveforms which approximate to part of these waveforms and the power coupling coefficient h. In addition, the model added waveforms are obtained by varying h in equation (9) in which 6 is substituted in n in above equation (9).

More specifically, FIG. 11A illustrates by a solid line part of an added waveform when the wavelength of pulse light is 1550 [nm], and illustrates by a broken line a model added waveform which approximates to part of this added waveform. Meanwhile, FIG. 11B illustrates by a solid line part of an added waveform when the wavelength of pulse light is 1625 [nm], and illustrates by a broken line a model added waveform which approximates to part of this added waveform.

As is clear from FIG. 11A, it was found that the added waveform obtained from the measurement result of the OTDR 2 approximates to a model added waveform when the power coupling coefficient h is 0.00015 [m$^{-1}$].

Meanwhile, as is clear from FIG. 11B, it was found that the added waveform obtained from the measurement result of the OTDR 2 approximates to a model added waveform when the power coupling coefficient h is 0.0007 [m$^{-1}$].

In addition, linear portions of the added waveforms in FIGS. 11A and 11B represent that crosstalk is saturated because the length of the seven-core fiber in Example 2 is long enough. In case of an optical fiber in which crosstalk is saturated, according to a conventional crosstalk measuring method, all light intensities become uniform at an emission end, and therefore only a method which is accompanied by fracture of the optical fiber can only measure crosstalk characteristics such as a power coupling coefficient. Meanwhile, the present invention can measure crosstalk characteristics such as a power coupling coefficient without destroying an optical fiber as described above.

Thus, the crosstalk measuring method according to the first embodiment includes: an acquiring step SP1 of acquiring data which indicates a distance distribution of an intensity of light which enters one end of a core of a multicore fiber and returns to the one end, and data which indicates a distance distribution of an intensity of light which enters other end of the core and returns to the other end; a waveform processing step SP2 of generating a waveform which needs to be matched with a model waveform, using an inverted intensity distribution waveform obtained by symmetrically inverting at a center position of a distance one of a first intensity distribution waveform indicated by the data which indicates the distance distribution of the intensity of the light returning to the one end and a second intensity distribution waveform indicated by the data which indicates the distance distribution of the intensity of the light returning to the other end and the other one of the first intensity distribution waveform and the second intensity distribution waveform; and a waveform matching step SP3 of detecting a waveform which approximates to a shape of the waveform obtained as a processing result of the waveform processing step, from a plurality of model waveforms in different shapes. This crosstalk measuring method is equivalent to a combination of claim 1 and claim 2 of the claims of the present application.

Thus, the crosstalk measuring device 1 according to the first embodiment includes: a waveform processing unit 3 which performs waveform processing using a first intensity distribution waveform indicated by a distance distribution of an intensity of light which enters one end of a core of a multicore fiber and returns to the one end, and a second intensity distribution waveform indicated by a distance distribution of an intensity of light which enters other end of the core and returns to the other end; and a waveform matching unit 4 which detects a waveform which approximates to a shape of the waveform obtained as a processing result of the waveform processing unit, from a plurality of model waveforms in different shapes, and the waveform processing unit 3 generates a waveform which needs to be matched with the model waveform, using an inverted intensity distribution waveform obtained by symmetrically inverting at a center position of a distance one of the first intensity distribution waveform and the second intensity distribution waveform and the other one of the first intensity distribution waveform and the second intensity distribution waveform. This crosstalk measuring device 1 is equivalent to a combination of claim 8 and claim 9 of the claims of the present application.

(2) Second Embodiment

Next, a preferred second embodiment of the present invention will be described. It should be noted that components that are identical or similar to those in the first embodiment are denoted by the same reference numerals as those used in the first embodiment, and the same explanation will not be repeated.

Figure 12:
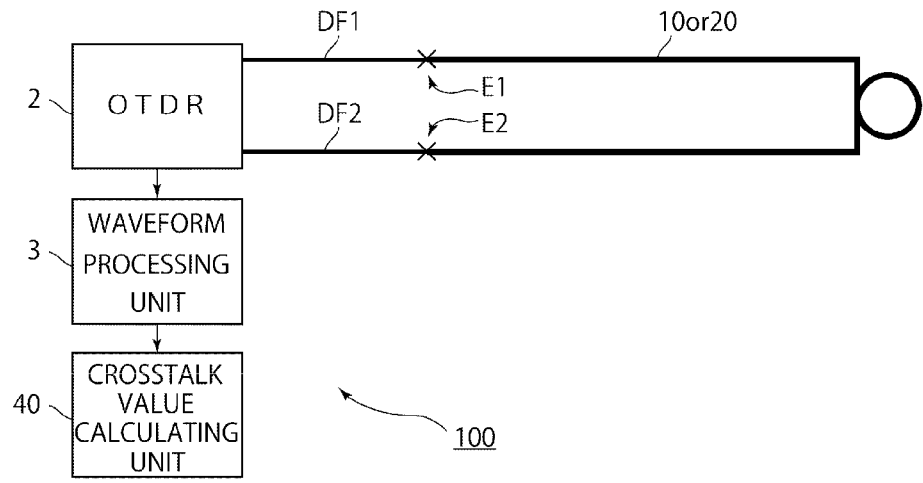
FIG. 12 is a view illustrating a configuration of the crosstalk measuring device according to a second embodiment.

FIG. 12 is a view illustrating a configuration of a crosstalk measuring device 100 according to the second embodiment. As illustrated in FIG. 12, the crosstalk measuring device 100 is newly provided with a crosstalk value calculating unit 40 instead of a waveform matching unit 4 according to the first embodiment.

<Crosstalk Value Calculating Unit 40>

The crosstalk value calculating unit 40 calculates a crosstalk value at an arbitrary position of a multicore fiber 10 or 20 in a longitudinal direction, from an added waveform WF4 obtained as a processing result of a waveform processing unit 3.

In case of the present embodiment, the crosstalk value calculating unit 40 first calculates a power coupling coefficient of the added waveform WF in a length direction based on the following equation which is a relationship equation which represents leakage of light at a position of the added waveform WF in the length direction.

$$I_s(z) - I_E(z) = 5\log(P_{0s}P_{0E}) + 10\log(\alpha_s(z)B(z)) + 5\log\left(\frac{(1+n\exp(-2(n+1)h(z)z))(1+n\exp(-2(n+1)h'(z)(L-z)))}{(n+1)(1+n\exp(-2(n+1)\bar{h}L))}\right) \quad (12)$$

The power coupling coefficient is a coefficient which indicates the degree of leakage of light, and is represented by h in above equation (12). In addition, h which is added a bar at an upper portion in a denominator in above equation (12) represents an average value of the power coupling coefficient. Further, h(z) in a numerator in above equation (12) represents a power coupling coefficient to a spot z spaced an arbitrary distance apart from one end, and h'(z) in the numerator represents a power coupling coefficient to the spot z spaced an arbitrary distance apart from the other end.

This equation (12) is obtained by changing only the third term of above equation (9). That is, in above equation (9), only the average value of the power coupling coefficient is defined as h. By contrast with this, in above equation (12), the average value of the power coupling coefficient is not only defined as h which is added a bar at the upper part, and power coupling coefficients which include distance dependency are newly defined as h(z) and h'(z).

Figure 13:
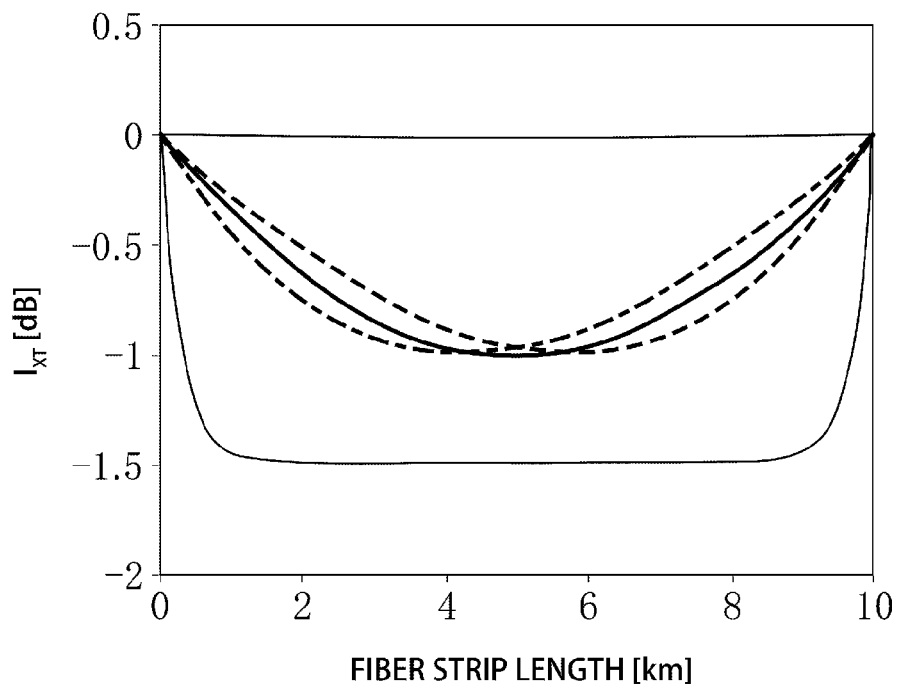
FIG. 13 is a graph illustrating added waveform models when a power coupling coefficient fluctuates and does not fluctuate.

Meanwhile, FIG. 13 illustrates added waveform models when a power coupling coefficient fluctuates and does not fluctuate. FIG. 13 illustrates added waveform models the power coupling coefficients of which do not fluctuate by a bold solid line and a thin solid line, illustrates an added waveform model the power coupling coefficient of which increases when a distance from the end portion of the multicore fiber increases by a broken line, and illustrates an added waveform model the power coupling coefficient of which decreases when the distance from the end portion of the multicore fiber increases by a dashed line.

In addition, the average value of the power coupling coefficients of these added waveform models is the same. Further, the average value of the power coupling coefficients of the upper added waveform models indicated by the thin solid line is $10^{-5}$ [m$^{-1}$], the average value of the power coupling coefficient of the lower added waveform model indicated by the thin solid line is $10^{-3}$ [m$^{-1}$], and the average values of the power coupling coefficients of the added waveform models indicated by the bold solid line, the broken line and the dashed line are $10^{-4}$ [m$^{-1}$]. Further, $I_{XT}$ of the vertical axis in FIG. 13 corresponds to the third term in above equation (12), and represents the level of a crosstalk component.

As illustrated in FIG. 13, although each gradient of each added waveform model is different, a minimum value of the crosstalk component of each added waveform model is common. Consequently, irrespectively of whether or not there is a gradient of a power coupling coefficient, the minimum value of the crosstalk component can be measured as the same value. In view of this, the following equation which defines the minimum value without the gradient holds at all times even when there is a gradient in the power coupling coefficient.

$$I_{XT\_min} = 5\log\left(\frac{(1+n\exp(-2(n+1)\bar{h}_2^L))(1+n\exp(-2(n+1)\bar{h}_2^L))}{(n+1)(1+n\exp(-2(n+1)\bar{h}L))}\right) \quad (13)$$

That is, it is possible to derive the average value of the power coupling coefficients matching the minimum value of the added waveform WF by solving above equation (13), and, when it is possible to obtain this average value, and calculate h(z) and h'(z) by substituting the average value in above equation (12).

Next, the crosstalk value calculating unit 40 substitutes in above equation (10) a power coupling coefficient calculated in above equation (12), and calculates a crosstalk value at an arbitrary distance z site of the multicore fiber 10 or 20. In addition, the crosstalk value at each site z of the multicore fiber 10 or 20 in the longitudinal direction may be calculated.

Next, a crosstalk measuring method of the crosstalk measuring device 1 will be described.

Figure 14:
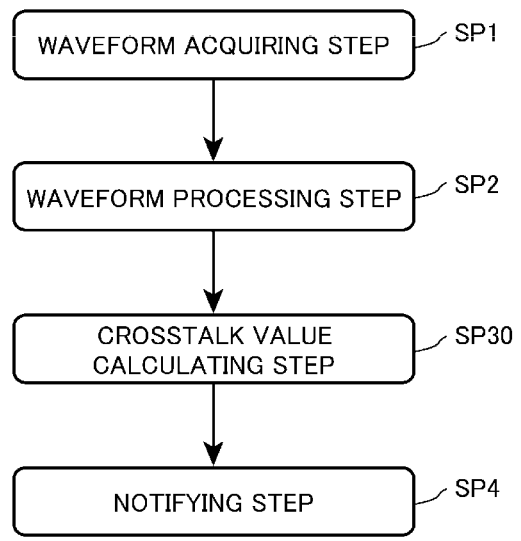
FIG. 14 is a view illustrating a flowchart of a crosstalk measuring method according to the second embodiment.

FIG. 14 is a view illustrating a flowchart of a crosstalk measuring method according to the second embodiment. As illustrated in FIG. 14, the crosstalk measuring method according to the present embodiment differs from a crosstalk measuring method according to the first embodiment in newly including a crosstalk value calculating step SP30 instead of a waveform matching step SP3 according to the first embodiment.

<Crosstalk Value Calculating Step SP30>

In this crosstalk value calculating step SP30, a crosstalk value at an arbitrary position of the multicore fiber 10 or 20 in the longitudinal direction is calculated from the added waveform WF4 obtained as a processing result of the waveform processing unit 3.

Specifically, as described above, the power coupling coefficient is calculated using equation (12), and the crosstalk value at an arbitrary position of the multicore fiber 10 or 20 in the length direction is calculated using the power coupling coefficient and equation (10).

According to the present embodiment, a crosstalk value is calculated from the added waveform WF4 by way of calculation, so that it is possible to reduce storage capacity by the degree corresponding to reduction of a model waveform compared to the first embodiment where the added waveform WF4 and the model waveforms are matched. Further, it is possible to reduce a calculation load by a degree of skip of matching with model waveforms.

In addition, it is possible to recognize a position of crosstalk in a core length direction and a level of the crosstalk based on a waveform shape which differs according to a level of a component produced by crosstalk as a factor.

Next, Modified Example of the second embodiment will be described.

Although a crosstalk value is calculated from the added waveform WF4 in the second embodiment, a crosstalk value may be calculated from a subtracted waveform similar to Modified Example of the first embodiment. In addition, when a crosstalk value is calculated from the subtracted waveform, for example, a crosstalk value is calculated using above equation (11) and equation (10).

In the second embodiment, a crosstalk value is calculated from the added waveform WF4 using above equation (12) and equation (10). However, a crosstalk value may be calculated using above equation (9) and equation (10). Further, a crosstalk value may be calculated from an added waveform or a subtracted waveform using operation expressions other than above equation (9), equation (10), equation (11) or equation (12). In addition, above equation (9) may be changed to equation (12) in the first embodiment.

The crosstalk measuring device and the crosstalk measuring method according to the present invention are applicable in an industrial field which handles a multicore fiber.

What is claimed is:

1. A crosstalk measuring method comprising:
    an acquiring step of acquiring data which indicates a distance distribution of an intensity of light which enters one end of a core of a multicore fiber and returns to the one end, and data which indicates a distance distribution of an intensity of light which enters other end of the core and returns to the other end; and
    a waveform processing step of generating a waveform which includes as a main component a component produced by crosstalk as a factor, using an inverted intensity distribution waveform obtained by symmetrically inverting at a center position of a distance one of a first intensity distribution waveform indicated by the data which indicates the distance distribution of the intensity of the light returning to the one end and a second intensity distribution waveform indicated by the data which indicates the distance distribution of the intensity of the light returning to the other end and the other one of the first intensity distribution waveform and the second intensity distribution waveform.

2. The crosstalk measuring method according to claim 1, further comprising
    a waveform matching step of detecting a waveform which approximates to a shape of the waveform obtained as a processing result of the waveform processing step, from a plurality of model waveforms in different shapes.

3. The crosstalk measuring method according to claim 2, wherein
    the waveform matching step comprises dividing the waveform obtained as the processing result in the waveform processing step into sections including a plurality of distance widths, and detecting a waveform which approximates to an entire or partial shape of a partial waveform in each of the sections, from the plurality of model waveforms.

4. The crosstalk measuring method according to claim 3, wherein:
    the waveform processing step comprises adding and subtracting the inverted intensity distribution waveform and the other one of the first intensity distribution waveform and the second intensity distribution waveform; and
    the waveform matching step comprises deciding whether or not to divide an added waveform obtained as an addition result of the waveform processing step into sections including a plurality of time widths, using a subtracted waveform obtained as a subtraction result of the waveform processing step.

5. The crosstalk measuring method according to claim 3, wherein the waveform processing step comprises adding the inverted intensity distribution waveform and the other one of the first intensity distribution waveform and the second intensity distribution waveform, and generating a waveform which needs to be matched with the model waveforms.

6. The crosstalk measuring method according to claim 3, wherein:
    the waveform processing step comprises adding and subtracting the inverted intensity distribution waveform and the other one of the first intensity distribution waveform and the second intensity distribution waveform; and
    the waveform matching step comprises:
    detecting a waveform which approximates to a shape of a subtracted waveform obtained as a subtraction result of the waveform processing step, from a plurality of model subtracted waveforms in different shapes; and
    detecting a waveform which approximates to a shape of an added waveform obtained as an addition result of the waveform processing step, from a plurality of model added waveforms in different shapes.

7. The crosstalk measuring method according to claim 2, wherein:
    the waveform processing step comprises adding and subtracting the inverted intensity distribution waveform and the other one of the first intensity distribution waveform and the second intensity distribution waveform; and
    the waveform matching step comprises:
    detecting a waveform which approximates to a shape of a subtracted waveform obtained as a subtraction result of the waveform processing step, from a plurality of model subtracted waveforms in different shapes; and
    detecting a waveform which approximates to a shape of an added waveform obtained as an addition result of the waveform processing step, from a plurality of model added waveforms in different shapes.

8. The crosstalk measuring method according to claim 2, wherein the waveform processing step comprises adding the inverted intensity distribution waveform and the other one of the first intensity distribution waveform and the second intensity distribution waveform, and generating a waveform which needs to be matched with the model waveforms.

9. The crosstalk measuring method according to claim 1, wherein the waveform processing step comprises adding the inverted intensity distribution waveform and the other one of the first intensity distribution waveform and the second intensity distribution waveform, and generating a waveform which needs to be matched with the model waveforms.

10. The crosstalk measuring method according to claim 1, further comprising a crosstalk value calculating step of calculating a crosstalk value at an arbitrary position of the multicore fiber in a longitudinal direction, from the waveform obtained as a processing result of the waveform processing step.

11. A crosstalk measuring device comprising a waveform processing unit which performs waveform processing using a first intensity distribution waveform indicated by a distance distribution of an intensity of light which enters one end of a core of a multicore fiber and returns to the one end, and a second intensity distribution waveform indicated by a distance distribution of an intensity of light which enters other end of the core and returns to the other end, wherein the waveform processing unit generates a waveform which includes as a main component a component produced by crosstalk as a factor, using an inverted intensity distribution waveform obtained by symmetrically inverting at a center position of a distance one of the first intensity distribution waveform and the second intensity distribution waveform and the other one of the first intensity distribution waveform and the second intensity distribution waveform.

12. The crosstalk measuring device according to claim 11, further comprising a waveform matching unit which detects a waveform which approximates to a shape of the waveform obtained as a processing result of the waveform processing unit, from a plurality of model waveforms in different shapes.

13. The crosstalk measuring device according to claim 12, wherein the waveform matching unit divides the waveform obtained as the processing result in the waveform processing step into sections including a plurality of distance widths, and detects a waveform which approximates to an entire or partial shape of a partial waveform in each of the sections, from the plurality of model waveforms.

14. The crosstalk measuring device according to claim 13, wherein:

the waveform processing unit adds and subtracts the inverted intensity distribution waveform and the other one of the first intensity distribution waveform and the second intensity distribution waveform; and the waveform matching unit decides whether or not to divide an added waveform obtained as an addition result of the waveform processing unit into sections including a plurality of time widths, using a subtracted waveform obtained as a subtraction result of the waveform processing unit.

15. The crosstalk measuring device according to claim 13, wherein the waveform processing unit adds the inverted intensity distribution waveform and the other one of the first intensity distribution waveform and the second intensity distribution waveform.

16. The crosstalk measuring device according to claim 13, wherein:

the waveform processing unit adds and subtracts the inverted intensity distribution waveform and the other one of the first intensity distribution waveform and the second intensity distribution waveform; and the waveform matching unit detects a waveform which approximates to a shape of a subtracted waveform obtained as a subtraction result of the waveform processing unit, from a plurality of model subtracted waveforms in different shapes and detects a waveform which approximates to a shape of an added waveform obtained as an addition result of the waveform processing unit, from a plurality of model added waveforms in different shapes.

17. The crosstalk measuring device according to claim 12, wherein:

the waveform processing unit adds and subtracts the inverted intensity distribution waveform and the other one of the first intensity distribution waveform and the second intensity distribution waveform; and the waveform matching unit detects a waveform which approximates to a shape of a subtracted waveform obtained as a subtraction result of the waveform processing unit, from a plurality of model subtracted waveforms in different shapes and detects a waveform which approximates to a shape of an added waveform obtained as an addition result of the waveform processing unit, from a plurality of model added waveforms in different shapes.

18. The crosstalk measuring device according to claim 12, wherein the waveform processing unit adds the inverted intensity distribution waveform and the other one of the first intensity distribution waveform and the second intensity distribution waveform.

19. The crosstalk measuring device according to claim 8, wherein the waveform processing unit adds the inverted intensity distribution waveform and the other one of the first intensity distribution waveform and the second intensity distribution waveform.

20. The crosstalk measuring device according to claim 11, further comprising a crosstalk value calculating unit which calculates a crosstalk value at an arbitrary position of the multicore fiber in a longitudinal direction, from the waveform obtained as a processing result of the waveform processing unit.

* * * * *